Nov. 12, 1963  G. McCONEGHY, JR., ETAL  3,110,246
HAY BALER
Filed Jan. 11, 1962  2 Sheets-Sheet 1

INVENTORS
George McConeghy Jr.
Homer N. Grillot
Paul O. Pippel Atty.

Nov. 12, 1963 G. McCONEGHY, JR., ETAL 3,110,246
HAY BALER
Filed Jan. 11, 1962 2 Sheets-Sheet 2

INVENTORS.
George McConeghy
Homer N. Grillot
Paul O. Pippel Atty.

United States Patent Office 3,110,246
Patented Nov. 12, 1963

3,110,246
HAY BALER
George McConeghy, Jr., Western Springs, and Homer N. Grillot, Naperville, Ill., assignors to International Harvester Company, Chicago, Ill., a corporation of New Jersey
Filed Jan. 11, 1962, Ser. No. 165,607
9 Claims. (Cl. 100—139)

This invention relates to a new and improved hay baler.

The harvesting and baling of hay has undergone many changes and developments throughout the past years. These developments have included means to pick up previously windrowed hay and feed that hay in an even and uniform manner into a bale-forming chamber. The general principles of a one-man field-traversing hay baler is depicted in the Crumb et al. Patent 2,450,082. The present invention is concerned with a similar type of hay baler utilizing the same general path of travel of the hay through the machine, but incorporating various different components which permit a lighter weight baler, a more economical baler, and a baler which produces uniformly dense and compact bales.

A principal object of this invention is to provide a continuous hay feed for a bale-forming chamber.

An important object of this invention is the provision of a bale-forming chamber in which the input passage is never fully closed.

Another important object of this invention is to supply a hay-forming baler utilizing oscillating fingers as the means of compression of the hay within a bale-forming chamber.

A still further important object of this invention is to provide a transversely feeding conveyor having cooperation with an oscillating finger compression means.

Another and still further important object of this invention is to provide an auger for delivering hay along a receiving platform and into an opening in a bale-forming chamber having a plurality of compressing fingers moving past the opening and acting to remove the hay from the discharge end of the auger conveyor and compress that hay within the bale-forming chamber.

Another and still further important object of this invention is to provide a storage area in a bale-forming chamber during the compression stroke of a plurality of compressing fingers.

Still another important object of this invention is to supply a hay storage area in a bale-forming chamber which is successively cleaned of hay on each oscillation of integrally moving hay compressing fingers.

Another important object of this invention is the provision of a hay baler in which a plurality of oscillating fingers is employed to compress the hay in a bale-forming chamber.

Still another important object of this invention is to provide a compressor finger type of hay baler wherein the hay compressing fingers move throughout a path which takes them in front of the hay being fed to the forming chamber to thereupon insure movement of all of the hay rearwardly in the bale-forming chamber.

Another important object of this invention is to provide a hay baler having a single conveyor in the form of an auger for feeding hay to and through a side opening in a bale-forming chamber for subsequent compression by a plurality of compressing fingers.

Other and further important objects and advantages will become apparent from the disclosures in the following specification and accompanying drawings.

Figure 1:
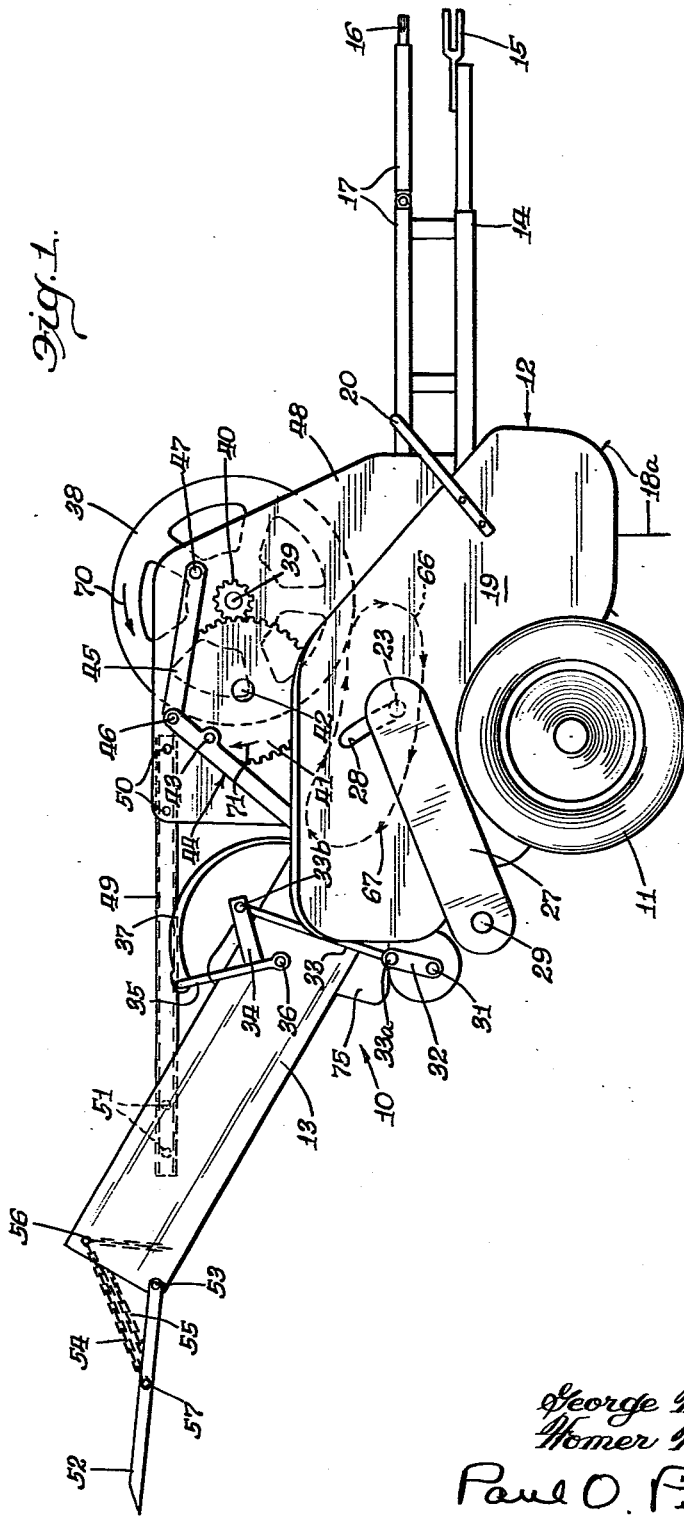
FIGURE 1 is a side-elevational view of the hay baler of this invention.

The reference numeral 10 indicates generally a hay baler. The hay baler is a machine of the type capable of traversing a field of windrowed hay, harvesting that hay, forming bales, and tying the bales in bale formation. As stated previously, this is the type of machine as depicted in the earlier Crumb et al, Patent 2,450,082.

The baler 10 of this invention includes a wheel support 11, a harvesting portion 12 and a bale-forming chamber 13. In the present instance the chamber 13 is inclined upwardly and rearwardly so that the loose hay is taken into the machine at a relatively low position and discharged as condensed hay in tied bales at a relatively high position on the machine. The baler further includes a hitch frame 14 with a clevis 15 at the forward end thereof. Tse clevis is used to form the attaching means between the baler 10 and a pulling tractor or the like. The tractor or other source of pulling power has not been shown inasmuch as it forms no part of the present invention. A power take-off shaft 16 is adapted to engage a power take-off mechanism on a pulling tractor and deliver rotational drive from the pulling tractor back to the baler operating mechanisms. The shaft 16 is carried within a tubular housing 17 at a position spaced above the frame 14.

Figure 2:
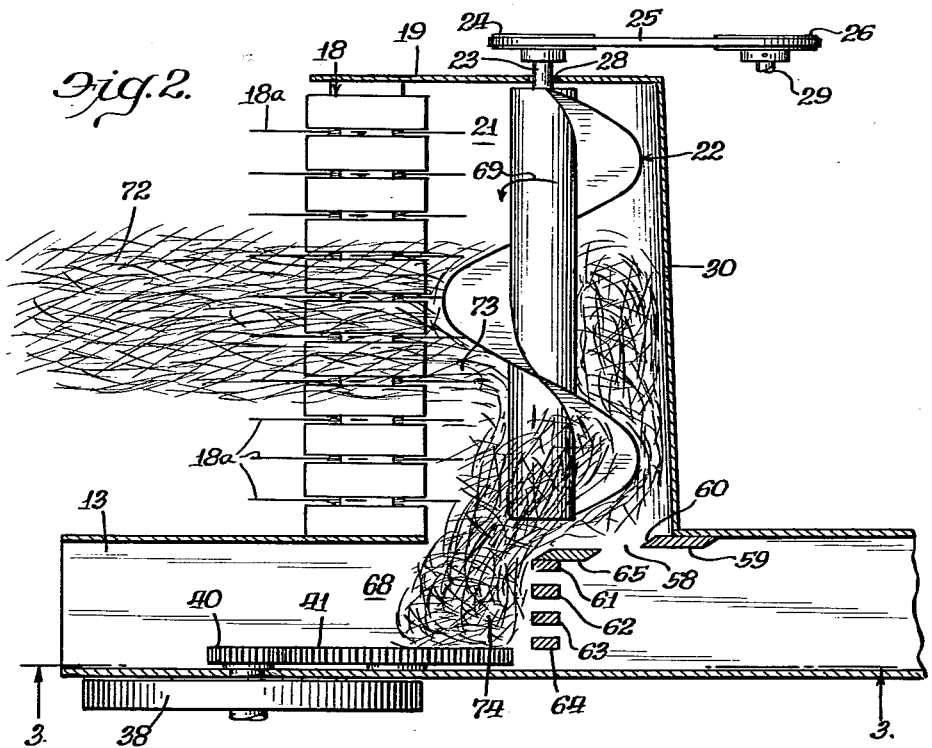
FIGURE 2 is a top plan view partially in section of a portion of the hay baler as shown in FIGURE 1.

The harvesting portion 12 of the baler 10 is provided at its forward end with a hay pickup mechanism having a plurality of transversely spaced-apart spring pickup fingers 18a. The harvesting portion 12 has an end wall 19 which aids in supporting a holddown or top guide 20 for directing hay into the harvesting portion and onto a deck or platform 21 as shown in FIGURE 2. An open end auger conveyor 22 is disposed across the platform deck 21 arranged so that hay fed upwardly over the pickup mechanism 18 will be delivered directly into the side of the auger which carries the hay transversely on the platform 21. The hay is thus moved from the harvesting portion 12 to the bale-forming chamber 13 at the far side of the baler. The auger 22 is carried on a shaft 23 which has a sheave 24 mounted on its outer end. A V-belt 25 is adapted to impart drive to the sheave 24. A sheave 26 is spaced apart from the sheave 24 but is in planar alignment therewith. Sheave 26 is the drive sheave and imparts movement to the V-belt 25. As shown in FIGURE 1 a housing or cover shield 27 conceals the drive mechanism for the auger 22. An elongated arcuate slot 28 in the end wall 19 permits arcuate swinging movement of the auger and shaft 23 about the pivot shaft 29 of the spaced-apart sheave 26. A similar floating auger mechanism is shown in the earlier mentioned Crumb et al. Patent 2,450,082. The harvesting portion further includes a back wall 30 to thereupon confine the hay fed by the open end auger 22 for delivery to the bale-forming chamber 13.

A shaft 31 indirectly receives drive from the tractor power take-off through the shaft 16. The shaft 31 shown in FIGURE 1 has a crank 32 mounted thereon for rotational movement about the shaft 31 as a center. A connecting link 33 is pivotally attached to the outer end of the crank arm 32 as shown at 33a. An arm 34 fixedly mounted at one end on a bail shape needle arm 35 pivotally receives the upper end of the connecting link 33 at its other end at 33b. The needle arm 35 is pivotally mounted at 36 on the side of the bale-forming chamber 13. Arcuately shaped needles are carried on an outer portion of the needle arm 35 and act to carry bale-encircling strands of either twine or wire around the completed bales as they are moved upwardly and rearwardly through the inclined bale-forming chamber 13.

A flywheel 38 is mounted on a shaft 39 which as shown in FIGURE 2 is journally mounted on the baler. The shaft 39 also carries pinion gear 40. The pinion gear 40 is in meshing engagement with large bull gear 41. The bull gear 41 is mounted on a shaft 42.

A crank 43 is mounted on the bull gear 41 at a position spaced from the center shaft 42. Compressor fingers 44 are pivotally mounted on the crank connection 43 on the bull gear 41. One end of a constraining bar 45 is pivotally mounted at 46 to the upper end of the compressor fingers 44. The constraining bar 45 is pivotally attached at its other end at 47 on a housing 48 which contains driving elements (not shown) to transmit rotational drive from a tractor power take-off through the shaft 16 to the pinion gear 40. This drive mechanism (elements 41, 45, 64, etc.) constitutes a four-bar linkage, one inherent attribute of which is to drive element 65 through the kidney-shaped path shown at 66.

Brace members 49 in the form of channels are shown joining the housing 48 and the upwardly and rearwardly inclined bale-forming chamber 13. The brace member 49 is shown fastened at 50 to the housing 48 and at 51 to the inclined bale-forming chamber 13.

A bale discharge pan 52 is hingedly mounted at 53 on the upper rearward end of the chamber 13. The discharge pan 52 may be adjusted at any desired angle of bale discharge by shortening or lengthening side-holding chains 54 and 55 which extend between the pan and the side walls of the chamber 13. One end of each chain is anchored at 56 on the bale-forming chamber 13 and the other end of each chain is anchored at 57 to the pan 52. Thus if it is desired to discharge the bales to the ground the pan 52 is inclined downwardly for an easy drop of the bales, or if the bales are to be discharged onto the bed of a wagon or truck the pan 52 may be adjusted as shown in FIGURE 1 so that the bales may slide off directly onto the bed.

As best shown in FIGURE 2, the bale-forming chamber 13 has a side opening 58 through which material to be baled is delivered to the chamber 13. The unjournaled or open end of the auger 22 is located directly opposite the opening 58. The rearward edge of the side opening 58 is provided with a generally vertically disposed stationary knife 59 having a forwardly disposed shear edge 60 so that hay fed rearwardly and upwardly in the inclined bale-forming chamber 13 will have to pass the stationary shear knife.

The plurality of compressor fingers 44 as shown in FIGURE 2 includes spaced-apart fingers 61, 62, 63, and 64. The compressor fingers have been identified as a unit by the numeral 44 and specifically the several fingers are identified by the numerals 61, 62, 63, and 64. The innermost finger 61 is provided with a generally vertically disposed knife element 65 thereon. The baler of this invention employs the plurality of oscillating compressor fingers to compress the hay within the bale-forming chamber in lieu of a reciprocating plunger which is usually employed to accomplish bale compression. The relative width of the compressor fingers is substantially small compared to the extent of the side opening 58 in the bale-forming chamber 13. Thus there is no time when the opening 58 is closed to the admission of more hay.

The rearward motion of the compressor fingers 44 through the bale-forming chamber 13 causes the fingers to pass the opening 58 and to pick up hay and move it rearwardly into the upwardly and rearwardly inclined portion of the chamber 13. The forwardly disposed knife edge 60 of the stationary knife 59 is arranged to cooperate with the knife 65 to effect a shearing of hay fed therepast. This causes a separation of the charges of hay which are fed to the bale chamber 13. Of course, this shearing also acts to permit ready separation of hay after the strands of a completed bale are cut and avoids entanglement of one bale with a succeeding bale.

Figure 3:
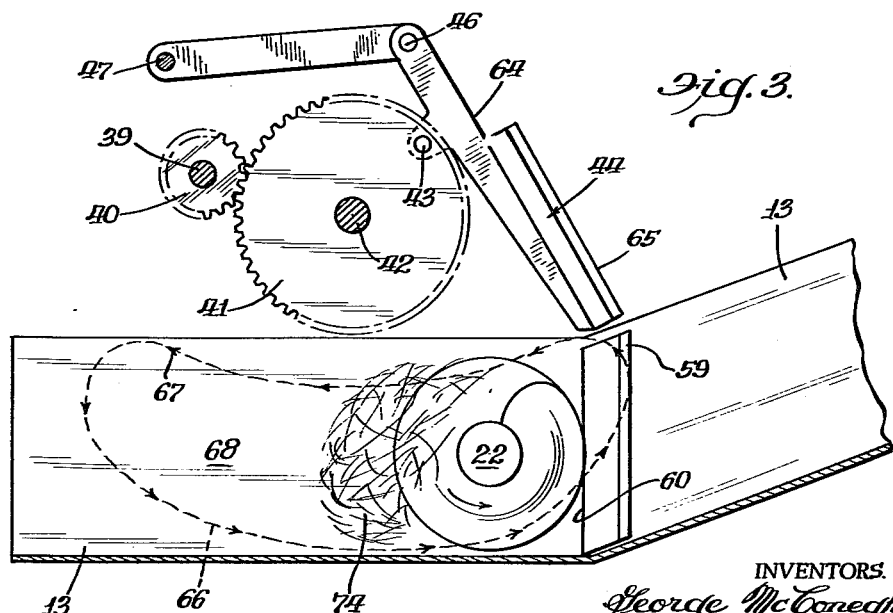
FIGURE 3 is a sectional view taken on the line 3—3 of FIGURE 2.

The path of movement of the compressor fingers is shown at 66 in both FIGURES 1 and 3 and the arrows 67 indicate the direction of movement. It will be noted that as the fingers move forwardly they are substantially in an up position out of the bale-forming chamber 13 and then at the extreme forward end of their travel the fingers move downwardly through an area 68 defined as a preliminary hay storage area in the bale-forming chamber 13 located forwardly of the side opening 58. Thus the compressor fingers act to clean out or empty the storage area 68 on each cycle of movement of the compressor fingers through this kidney-shaped path of travel 66 as shown in FIGURE 3. This preliminary storage area permits constant feeding of hay through the chamber 13 even though the compressor fingers 44 are moving rearwardly on their compression stroke and causing hay to be formed into bales.

As shown in FIGURE 2 the direction of rotation of the auger 22 is indicated by the arrow 69. The auger turns over forwardly and envelops the hay fed thereto for lateral delivery through the open end thereof toward the forward end of the side opening 58. Of course, in the operation of the baler hay may be discharged across the full width of the open end of the auger 22 for delivery through substantially the full width of the opening 58 in the chamber 13. The width of the plural packer or compressor fingers 44 is such that entrance of hay to the opening 58 is not completely blocked at any time during travel of these compressor fingers. In other words, the hay may be delivered to a position rearwardly of the plural compressor fingers whereupon the fingers directly move the hay past the cooperating shear knives 59 and 65 and into bale formation in the one end of the upwardly and rearwardly inclined chamber 13 on the rear side of the side opening 58. Or, the hay may be delivered to the bale-forming chamber through the side opening 58 on the other side thereof forwardly of the compressor fingers to the preliminary storage chamber 68 in a relatively horizontally disposed portion of the bale-forming chamber for subsequent picking up and delivering rearwardly into the upwardly and rearwardly inclined bale-forming portion of the chamber 13.

As best shown in FIGURE 1, the flywheel 38 is rotated in the direction of the arrow 70 whereas the bull gear 41 is rotated in opposite direction as shown by the arrow 71. Movement of the compressor fingers 44 is occasioned by their direct attachment to the bull gear 41 through the crank 43 thus insuring movement of the compressor fingers along the kidney-shaped path 66 in the direction of the arrows 67 thereon.

In the operation of the device of this invention the baler is pulled through a field having the hay therein preliminarily laid in windrows for convenient harvesting by the pickup 18 of the hay baler 10. FIGURE 2 shows the hay in windrows 72. The hay then moves upwardly over the pickup cylinder 18 by reason of the spring fingers 18a. The hay is deposited onto the platform or deck 21 of the harvesting portion 12 of this machine. The platform auger 22 which is unjournaled at its discharge end adjacent the side opening 58 in the bale-forming chamber 13 rotates in the direction of the arrow 69 such that the hay now designated by the numeral 73 is folded downwardly and under the auger for delivery through the opening 58 into the bale-forming chamber 13. In the position of the auger as shown in FIGURE 2 the hay 73 is deposited in the preliminary storage area 68 of the chamber 13. The hay, identified by the numeral 74 in this position, is ready for formation into bales by the oscillation of the compressor fingers 44 as those fingers move through the substantially kidney-shaped path 66 in the direction of the arrows 67. This sweeping action by the fingers through the preliminary storage area 68 causes the hay to move past the cooperative knives 59 and 65 and to effect a shearing thereof.

Each charge of hay is thus separate and has no connection with a succeeding charge, or with hay being fed to the platform and thence to the bale-forming chamber 13. Each individual charge of hay is now passed rearwardly into the upwardly and rearwardly inclined chamber 13 with other charges of hay to constitute bales. At this point the strand-carrying needles 37 encircle the formed bales with strands and by means of a knotter illustrated diagrammatically at 75 the bales are tied with the strands and thence discharged out of the upper rearward end of the chamber 13 and onto the discharge pan 52 as previously described.

There has thus been described a compact baler for hay utilizing various new principles of operation and incorporating those principles to achieve important advantages in baler design. The resultant baler is considerably lighter in weight than previously employed balers which usually employed reciprocating compressing plungers and had to be built substantially heavier to withstand the jarring effect of the plunger. In this new baler the compressor fingers never bar entry of hay into the forming chamber and there is no necessity of providing auxiliary conveying means for delivering hay from a platform auger to the baler-forming chamber.

Obviously numerous details of construction may be varied throughout a wide range without departing from the principles disclosed herein and we therefore do not propose limiting the patent granted hereon otherwise than as necessitated by the appended claims.

What is claimed is:

1. A hay baler comprising an elongated chamber, said chamber having a preliminary hay storage area in one end thereof, a bale-forming area in the other end thereof, means movable in a kidney-shaped path in said chamber for transferring hay from the storage area to the bale-forming area, and means on said baler for delivering hay to said chamber at an intermediate portion of said kidney-shaped path and normal thereto.

2. A device as set forth in claim 1 in which said means for transferring hay comprises at least one compressor finger movable through said bale-forming chamber in a kidney-shaped path to sweep hay from the storage end of said chamber to the bale-forming end.

3. A device as set forth in claim 1 in which said elongated chamber is generally longitudinally disposed, and said means for transferring hay comprises compressor fingers movable along said kidney-shaped path from a position in front of the hay in said storage area rearwardly to a position rearwardly of said intermediate delivery portion.

4. A device as set forth in claim 3 in which said compressor fingers are completely withdrawn from said bale-forming chamber on their return stroke forwardly.

5. A hay baler comprising an auger conveyor mounted for rotation, a bale-forming chamber disposed generally at right angles to said conveyor, said bale-forming chamber having a side opening adjacent the discharge end of said auger conveyor, means for compressing hay in one end of said bale-forming chamber said means comprising a four-bar linkage including a compressing finger, the tip of which is adapted to trace a kidnay-shaped path normal to said auger conveyor.

6. A hay baler comprising: a baling chamber, at least one compressing finger cooperating with said baling chamber for compressing hay therein, means connected to each said compressing finger for moving each said compressing finger in a substantially kidney-shaped path, and a hay inlet opening in said baling chamber adjacent and parallel to said substantially kidney-shaped path, whereby hay may be continuously fed into said baling chamber substantially within the limits of said kidney-shaped path and normal thereto.

7. A hay baler comprising: a baling chamber, at least one compressing finger cooperating with said baling chamber for compressing hay therein, a four-bar linkage connected to each said compressing finger for moving each said compressing finger in a substantially kidney-shaped path, and a hay inlet opening in said baling chamber adjacent and parallel to said kidney-shaped path, whereby hay may be continuously fed into said baling chamber substantially within the limits of said kidney-shaped path and normal thereto.

8. A hay baler comprising: a baling chamber, at least one compressing finger cooperating with said baling chamber for compressing hay therein, means connected to each said compressing finger for moving each said compressing finger in a substantially kidney-shaped path, a hay inlet opening in said baling chamber adjacent and parallel to said substantially kidney-shaped path, and means on said baler for delivering hay to said baling chamber through said hay inlet opening, whereby hay may be continuously fed into said baling chamber substantially within the limits of said kidney-shaped path and normal thereto.

9. A hay baler comprising: a baling chamber, at least one compressing finger cooperating with said baling chamber for compressing hay therein, a four-bar linkage connected to each said compressing finger for moving each said compressing finger in a substantially kidney-shaped path, a hay inlet opening in said baling chamber adjacent and parallel to said substantially kidney-shaped path, and an auger for delivering hay to said baling chamber through said hay inlet opening mounted adjacent and normal to said hay inlet opening, whereby hay may be continuously fed into said baling chamber substantially within the limits of said kidney-shaped path and normal thereto.

References Cited in the file of this patent

UNITED STATES PATENTS

| 2,909,887 | Class | Oct. 27, 1959 |
| 2,923,230 | Bornzin | Feb. 2, 1960 |

FOREIGN PATENTS

| 1,075,370 | Germany | Feb. 11, 1960 |